United States Patent
Brewer et al.

(10) Patent No.: US 10,823,248 B2
(45) Date of Patent: Nov. 3, 2020

(54) HYDRAULIC DAMPER

(71) Applicant: Claverham Limited, Solihull (GB)

(72) Inventors: Paul Brewer, Bristol (GB); Reg Raval, North Somerset (GB); Suat Bekircan, Bath (GB)

(73) Assignee: CLAVERHAM LIMITED, Avon (GB)

( * ) Notice: Subject to any disclaimer, the term of this patent is extended or adjusted under 35 U.S.C. 154(b) by 0 days.

(21) Appl. No.: 16/266,257

(22) Filed: Feb. 4, 2019

(65) Prior Publication Data
US 2019/0242452 A1 Aug. 8, 2019

(30) Foreign Application Priority Data

Feb. 2, 2018 (EP) ..................................... 18275013

(51) Int. Cl.
*F16F 9/18* (2006.01)
*F16F 9/32* (2006.01)
(Continued)

(52) U.S. Cl.
CPC .............. *F16F 9/185* (2013.01); *F16F 9/182* (2013.01); *F16F 9/3257* (2013.01); *F16F 9/3271* (2013.01); *F16F 9/369* (2013.01); *F16F 9/43* (2013.01); *F16F 9/54* (2013.01); *F16F 2222/12* (2013.01); *F16F 2224/0208* (2013.01);
(Continued)

(58) Field of Classification Search
CPC ............... F16F 2230/06; F16F 2230/30; F16F 2230/0005; F16F 2226/04; F16F 2226/048; F16F 2222/12; F16F 2224/0208
See application file for complete search history.

(56) References Cited

U.S. PATENT DOCUMENTS 4,815,574 A 3/1989 Taylor et al.
4,921,224 A 5/1990 Fukumura et al.
(Continued)

FOREIGN PATENT DOCUMENTS

EP 0309144 A2 3/1989
JP S55112440 A 8/1980
(Continued)

OTHER PUBLICATIONS

Extended European Search Report for International Application No. 18275013.3 dated Aug. 1, 2018, 9 pages.

*Primary Examiner* — Vishal R Sahni
(74) *Attorney, Agent, or Firm* — Cantor Colburn LLP

(57) ABSTRACT

A hydraulic damper comprises an outer cylinder, and an inner cylinder slidably mounted within the outer cylinder for movement relative to the outer cylinder along a longitudinal axis. The inner cylinder has a circumferential wall circumscribing a bellows assembly. The bellows assembly comprises a first bellows section, a second bellows section, a damping plate attached to and separating the first and second bellows sections, a first closure element closing an end of the first bellows section opposite the damping plate to define a first chamber, and a second closure element closing an end of the second bellows section opposite the damping plate to define a second chamber. The first closure element is attached to the inner cylinder for movement therewith relative to the outer cylinder. The second closure element is also attached to the inner cylinder for movement therewith relative to the outer cylinder.

16 Claims, 1 Drawing Sheet

(51) Int. Cl.
 *F16F 9/36* (2006.01)
 *F16F 9/43* (2006.01)
 *F16F 9/54* (2006.01)

(52) U.S. Cl.
 CPC ..... *F16F 2226/04* (2013.01); *F16F 2226/048* (2013.01); *F16F 2230/0005* (2013.01); *F16F 2230/06* (2013.01); *F16F 2230/105* (2013.01); *F16F 2230/30* (2013.01); *F16F 2232/08* (2013.01)

(56) References Cited

U.S. PATENT DOCUMENTS

| | | | | | |
|---|---|---|---|---|---|
| 5,257,680 | A | * | 11/1993 | Corcoran | F16F 7/02 188/129 |
| 5,443,521 | A | * | 8/1995 | Knoth | A61F 2/68 188/314 |
| 5,507,191 | A | * | 4/1996 | Galbraith | G01L 3/22 73/862.09 |
| 6,129,185 | A | * | 10/2000 | Osterberg | F16F 6/00 188/267.2 |
| 6,345,707 | B1 | | 2/2002 | Klembczyk | |
| 2014/0291452 | A1 | * | 10/2014 | Martinez | F16F 9/526 244/173.2 |

FOREIGN PATENT DOCUMENTS

| | | |
|---|---|---|
| JP | S6073144 A | 4/1985 |
| WO | 03067118 A1 | 8/2003 |

\* cited by examiner

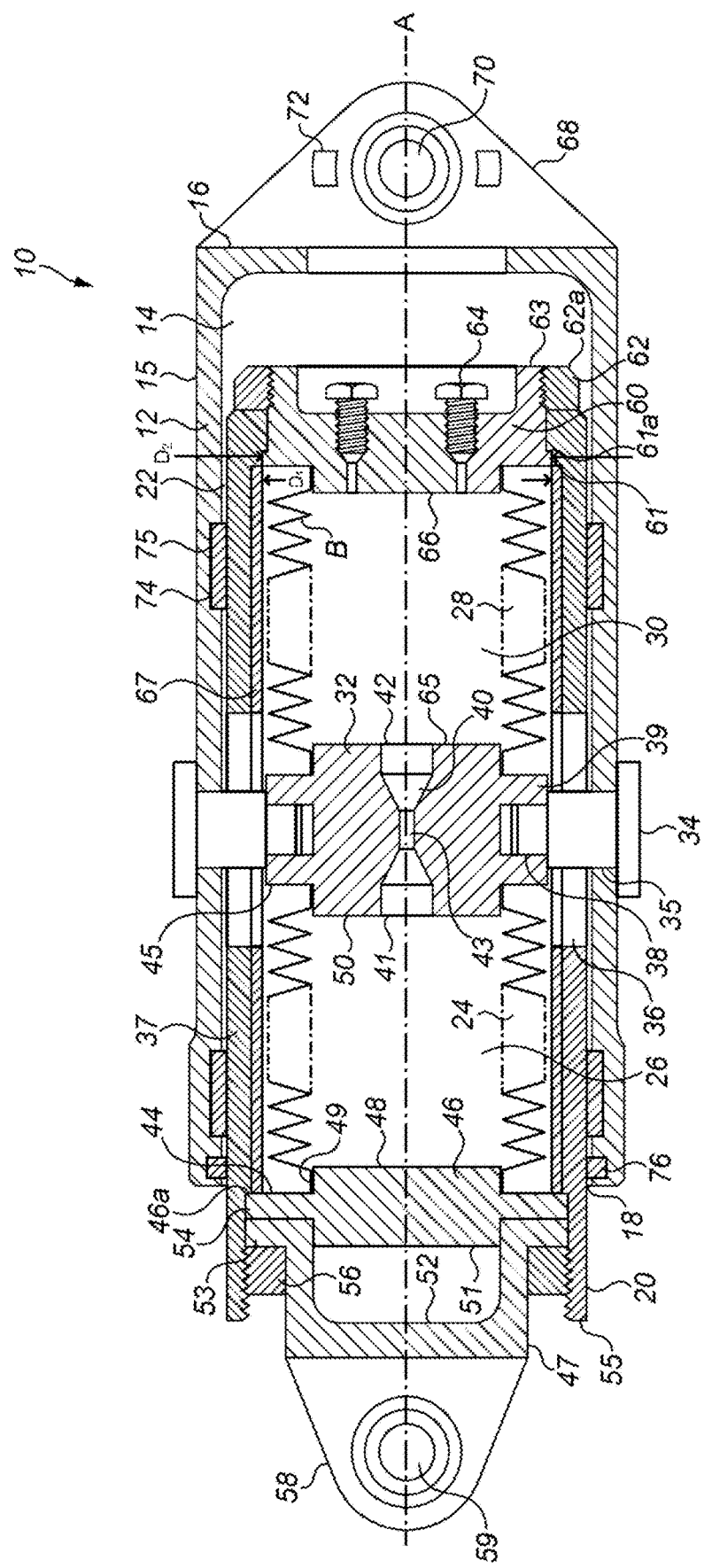

HYDRAULIC DAMPER

FOREIGN PRIORITY

This application claims priority to European Patent Application No. 18275013.3 filed Feb. 2, 2018, the entire contents of which is incorporated herein by reference.

TECHNICAL FIELD

The present disclosure relates generally to a hydraulic damper and more specifically to a hydraulic damper having a closed hydraulic circuit without seals.

BACKGROUND

Hydraulic dampers typically include a rod extending into a damper housing containing a damping fluid. A rod gland seal is typically provided between the rod and the housing to prevent leakage of damping fluid from the damper housing around the rod. However, leakage from the rod gland seal can occur due to worn or damaged seals, rod surface damage, and planned leakage designed to lubricate the rod seals in operation, which is necessary to prevent seal degradation caused by running dry. External leakage can be unsightly or even hazardous due to leakage onto adjacent hot surfaces. Moreover, unscheduled removal of hydraulic dampers exhibiting signs of external leakage is one of the most common failures currently found in hydraulic actuation systems and has a severe impact on the through-life cost of ownership of the equipment. The aerospace industry is driving towards extended 'Mean Time Before Overhaul' (MTBO) and preferably On-Condition replacement, i.e. the inspection of components at regular intervals and replacement only when specified removal criteria have been met.

It would therefore be advantageous to provide a hydraulic damper which reduces external leakage of hydraulic damping fluid.

SUMMARY

According to one embodiment of the present disclosure, there is provided a hydraulic damper comprising an outer cylinder, and an inner cylinder slidably mounted within the outer cylinder for movement relative to the outer cylinder along a longitudinal axis. The inner cylinder has a circumferential wall circumscribing a bellows assembly. The bellows assembly comprises a first bellows section, a second bellows section, a damping plate attached to and separating the first and second bellows sections, a first closure element closing an end of the first bellows section opposite the damping plate to define a first chamber, and a second closure element closing an end of the second bellows section opposite the damping plate to define a second chamber. The first closure element is attached to the inner cylinder for movement therewith relative to the outer cylinder. The second closure element is also attached to the inner cylinder for movement therewith relative to the outer cylinder. The damping plate has at least one damping passage extending therethrough and fluidly connecting the first chamber and the second chamber. The damping plate is fixed to the outer cylinder by a plurality of elements, each element extending through a respective opening in the circumferential wall of the inner cylinder, whereby the damping plate remains fixed relative to the outer cylinder in the longitudinal direction during movement of the inner cylinder relative to the outer cylinder in the longitudinal direction.

The first and/or second closure elements may be separate elements from the first and second bellows sections.

The first bellows section may be welded, for example electron beam welded, to the damping plate.

The first bellows section may be welded, for example electron beam welded, to the first closure element.

The second bellows section may be welded, for example electron beam welded, to the damping plate.

The second bellows section may be welded, for example electron beam welded, to the second closure element.

The first closure element may be retained between a step in the circumferential wall of the inner cylinder and an end cap.

The end cap may define an annular space between the end cap and the inner cylinder, and an externally threaded retaining ring may be received in the annular space and secure the end cap against the first closure element.

The end cap may be provided with a first eye end having a first coupling for mounting the inner cylinder to a first component.

The first coupling may be a spherical bearing.

The second closure element may be secured against a step in the circumferential wall of the inner cylinder, for example by an internally threaded retaining ring.

An end wall of the outer cylinder may be provided with a second eye end having a second coupling for mounting the outer cylinder to a second component.

The second coupling may be a spherical bearing.

At least one valve may be provided in one of the first and second closure elements, for example in the second closure element, for filling and/or bleeding the first and second chambers with hydraulic fluid.

A liner may be positioned in an annular space between each of the first and second bellows sections and the circumferential wall of inner cylinder.

The liner may comprise a low friction material, such as brass.

One or more linear bearings may be positioned between the outer cylinder and the circumferential wall of the inner cylinder. The linear bearings may facilitate relative axial movement between, and axial alignment of, the outer cylinder and the inner cylinder.

The outer cylinder may comprise a scraper contacting the circumferential wall of the inner cylinder around its circumference for preventing contaminants from entering an annular space therebetween.

According to another embodiment of the present disclosure, there is provided a method of assembling any of the above hydraulic dampers, comprising assembling the bellows assembly, inserting the bellows assembly into the inner cylinder, attaching the first and second closure elements of the bellows assembly to the inner cylinder, inserting the inner cylinder into the outer cylinder, and attaching the damping plate to the outer cylinder.

According to another embodiment of the present disclosure, there is provided a method of using any of the above hydraulic dampers, comprising applying a force on at least one of the inner cylinder and the outer cylinder to move the inner cylinder axially relative to the outer cylinder, the movement causing a volume of one of the first chamber and the second chamber to contract and a volume of the other of the first chamber and the second chamber to expand, wherein hydraulic fluid within the contracting chamber is forced from the contracting chamber, through the damping passage, and into the expanding chamber.

According to another embodiment of the present disclosure, there is provided a hydraulic damper bellows assembly comprising, a first bellows section, a second bellows section a damping plate attached to and separating the first and second bellows sections, a first closure element closing an end of the first bellows section opposite the damping plate to define a first chamber, and a second closure element closing an end of the second bellows section opposite the damping plate to define a second chamber, the damping plate having a damping passage extending therethrough and fluidly connecting the first chamber and the second chamber.

According to another embodiment of the present disclosure, there is provided a method of assembling the above hydraulic damper bellows assembly, comprising attaching, for example welding, one end of the first bellows section to the first closure element and an opposite end of the first bellows section to the damping plate, and attaching, for example welding, one end of the second bellows section to the second closure element and an opposite end of the second bellows section to the damping plate.

BRIEF DESCRIPTION OF THE DRAWINGS

Some exemplary embodiments and features of the present disclosure will now be described by way of example only, and with reference to the following drawings in which:

FIG. 1 shows a cross-section of a hydraulic damper in accordance with an embodiment of the present invention.

DETAILED DESCRIPTION

FIG. 1 illustrates a cross-section of a hydraulic damper 10 having a longitudinal axis A. The hydraulic damper 10 comprises an outer cylinder 12 having an internal cavity 14, a longitudinally extending annular circumferential wall 15, an end wall 16 and an open end 18, and an inner cylinder 20 slidably mounted within the internal cavity 14 of the outer cylinder 12. The outer cylinder 12 and the inner cylinder 20 define an annular space 22 therebetween. The outer cylinder 12 and the inner cylinder 20 may be made from any suitable materials, for example metals, for example steel or stainless steel or aluminium.

The inner cylinder 20 houses an internal bellows assembly B having a first bellows section 24 and a second bellows section 28 attached to and separated by a damping plate 32. At their ends remote from the damping plate 32, the first and second bellows sections 24, 28 are closed by respective first and second closure elements 46, 60, thereby defining first and second chambers 26, 30. With the bellows assembly B in a neutral position as illustrated in FIG. 1, the first chamber 26 and the second chamber 30 may have a substantially equal volume. The bellows assembly B is filled with a hydraulic damping fluid (not shown).

The damping plate 32 is fixed to the outer cylinder 12 by a plurality of fasteners such as pins 34. The pins 34 may be made from any suitable material, for example metal, for example steel or stainless steel. The number of pins 34 may vary between embodiments. For example, two or more pins, for example three, four or more pins may be provided. The pins 34 may be circumferentially equispaced about the assembly.

As can be seen from FIG. 1, each of the plurality of pins 34 extends radially inwardly through an opening 35 in the circumferential wall 15 of the outer cylinder 12, through an opening 36 in a circumferential wall 37 of the inner cylinder 20, and into a respective mount 38 in the outer circumferential surface 39 of the damping plate 32. The opening 36 in the circumferential wall 37 of the inner cylinder 20 may be formed as an elongate slot 36 which allows the inner cylinder 20 to move axially relative to the outer cylinder 12 and the damping plate 32 mounted thereto. In certain embodiments, the mounts 38 may be formed as discrete bores 38, for example threaded bores in the outer circumferential surface 39 of the damping plate 32. In other embodiments the outer circumferential surface 39 of the damping plate 32 may be provided with a circumferentially extending groove. This may facilitate assembly of the damper 10.

The damping plate 32 comprises a damping passage 40 extending therethrough, which fluidly connects the first chamber 26 and the second chamber 30. The damping passage 40 allows for an associated damping force as the hydraulic fluid contained within the bellows assembly B is forced therethrough, and may have any suitable configuration. For example, the damping passage 40 may comprise a first opening 41 to the first chamber 26 having a first diameter, a second opening 42 to the second chamber 30 having a second diameter substantially the same as the first diameter, and a narrowed portion 43 therebetween having a third diameter less than the first diameter and the second diameter. The diameter of the damping passage 40 may transition linearly from the first diameter to the second diameter and from the second diameter to the third diameter. Other configurations of damping passages will be apparent to the skilled person. The relative diameters and transitions therebetween may be determined by the required damping characteristics of the hydraulic damper 10. In this embodiment, the damping passage 40 is symmetrical in shape about a vertical centreline of the damping plate 32, such that the damping characteristics provided by the hydraulic fluid passing through the damping passage 40 will be symmetrical, i.e. the same in both directions of movement of the hydraulic fluid. In other embodiments, the damping characteristics may be asymmetrical, i.e. different for each direction of movement of the hydraulic fluid through the damping passage 40. The desired damping effect may be achieved through suitable shaping of the flow passage 40.

Also, while the embodiment illustrated comprises just one damping passage 40, a plurality of damping passages may be provided in other embodiments.

The first bellows section 24 is mounted at one end 44 to the inner cylinder 20 and at the other end 45 to the damping plate 32.

In one embodiment, as shown, the first closure element 46 is provided with a radial flange 54 which is retained between a step 46a in the circumferential wall 37 of the inner cylinder 20 and an end cap 47.

To facilitate attachment of the first bellows section 24 to the first closure element 46, the first closure element 46 may be provided with an axially projecting cylindrical post 48 with a radially outwardly facing circumferential surface 49. The one end 44 of the first bellows section 24 may fit over the post 48 and be secured to the radially outwardly facing circumferential surface 49 thereof in any suitable manner. In certain embodiments, the first bellows section 24 may be welded to the first closure element 46, for example by electron beam welding. The provision of the post 48 may facilitate welding.

The damping plate 32 may be provided with an axially projecting post 50 for attachment of the other end 45 of the first bellows section 24 thereto in a similar manner.

The first closure element 46 may also, as shown, be provided with a projecting post 51 for engagement within a bore 52 in the end cap 47.

The end cap 47 may comprise a radial flange 53 engaging the radial flange 54 of the first closure element 46. The end cap 47 is received within an end portion 55 of the circumferential wall 37 of the inner cylinder 20. An annular space is defined between the end cap 47 and the inner cylinder 20 which receives an externally threaded retaining ring 56. The retaining ring 56 is threadedly engaged to an internal thread formed on the end portion 55 of the circumferential wall 37 of the inner cylinder 20. When tightened, the retaining ring 56 clamps the radial flange 54 of the first closure element 46 between the end cap 47 and the step 46a. The end cap 47 may be provided with an eye end 58 having a coupling, for example a spherical bearing 59, for mounting a first end of the hydraulic damper 10 to a first component.

The second bellows section 28 extends from the damping plate 32 to the second closure element 60. The second closure element 60 may be made of the same material as the inner cylinder 20. The second closure element 60 may be provided with a radially extending flange 61 engaging a step 61a in the circumferential wall 37 of the inner cylinder 20. A retaining ring 62 having an internal thread may be threadedly engaged to an external thread 63 formed on an outer circumferential wall of the second closure element 60 to axially secure the second closure element 60 against the step 61a. The retaining ring 62 may, as illustrated, be provided with a chamfered edge 62a to allow for additional clearance when the damper 10 is entirely compressed, i.e. when the inner cylinder 20 is pushed the maximum distance into the outer cylinder 12 (to the right in the sense of the FIGURE). The second closure element 60 may comprise at least one valve 64 which allows for filling and/or bleeding the first and second chambers 26, 30 with hydraulic fluid. The at least one valve 64 may be recessed in the second closure element 60.

The second bellows section 28 may be attached to the second closure element 60 and the damping plate 32 in a similar manner to the manner in which the first bellows section 24 is mounted to the first closure element 46 and the damping plate 32. Thus the damping plate 32 and second closure element 60 may be provided with respective axially extending posts 65, 66 as shown.

In the above embodiment, it will be appreciated that the bellows assembly B may be assembled as a subassembly, or cartridge, prior to its insertion into the inner cylinder 20. The bellows assembly B may be filled with hydraulic fluid and bled before inserting it into the inner cylinder 20. Since the outer diameter of the radially extending flange 61 of the second closure element 60 is smaller than the internal diameter of the inner cylinder 20 but greater than the reduced internal diameter provided by the step 61a in the circumferential wall 37 of the inner cylinder 20, the bellows assembly may only be inserted into the inner cylinder 20 from the left in the sense of the FIGURE until the radially extending flange 61 engages the step 61a. The bellows assembly B may then be secured to the inner cylinder 20, by threadedly engaging the retaining ring 62 and the second closure element 60 to axially secure the radially extending flange 61 of the second closure element 60 against the step 61a of the circumferential wall 37 of the inner cylinder 20. The end cap 47 can then be inserted into the other end of the inner cylinder 20 and secured against the first closure element 46 by threaded engagement of the retaining ring 56 with the internal thread of the end portion 55 of the inner cylinder 20. The inner cylinder 20 may then be inserted into the outer cylinder 12 and fastened to the outer cylinder 12 using the fasteners 34.

In embodiments of the disclosure, a liner 67 may be positioned in an annular space between each of the first and second bellows sections 24, 28 and the circumferential wall 37 of the inner cylinder 20. The liner 67 may substantially prevent or reduce radial deflection of the first and second bellows sections 24, 28 during compression/expansion of the first and second bellows sections 24, 28. The liner 67 may also prevent contact between the bellows sections 24, 28 and the circumferential wall 37 of the inner cylinder 20. To facilitate the relative movement between the bellows sections 24, 28 and the liner 67, the liner 67 may be made from a low friction material. To avoid excessive wear of the liner 67, it may be made from a metallic material, for example bronze.

As can be seen from FIG. 1, the inner diameter $D_1$ of the liner 67 is greater than the outer diameter $D_2$ of the second closure element 60. This allows the liner 67 to be assembled to the bellows assembly B after the bellows assembly B has been assembled and prior to the latter being inserted into the inner cylinder 20. The liner 67 will simply be able to be passed over the outer diameter $D_2$ of the second closure element 60 to effect its assembly. Of course, in another embodiment, the first closure element 46 may additionally or alternatively dimensioned such that the liner 67 may be assembled thereover.

The end wall 16 of the outer cylinder 12 may be provided with an eye end 68 having a coupling, for example a spherical bearing 70, for mounting the second end of the hydraulic damper 10 to a second component. The eye end 68 may have anti-rotation pips 72 or other elements to limit rotational movement, for example about longitudinal axis A.

One or more linear bearings 74 may be provided in the annular space 22 between the circumferential wall 15 of the outer cylinder 12 and the circumferential wall 37 of the inner cylinder 20. The linear bearings 74 may act to facilitate relative axial movement between the outer cylinder 12 and the inner cylinder 20 and to maintain axial alignment thereof. The linear bearings 74 may be fixed to either the outer cylinder 12 or the inner cylinder 20. The linear bearings 74 may be plastic, for example PTFE, or metal, for example bronze. In some embodiments, as shown, the linear bearing 74 may comprise an annular element received within an annular groove 75 provided within one of the cylinders and making sliding engagement with an opposed surface of the other of the cylinders. Although only two linear bearings 74 are illustrated in this embodiment, more bearings may be provided if desirable. In other embodiments, one or both of the cylinders may be provided with a low friction coating to provide a bearing.

The outer cylinder 12 may be provided with a scraper 76 at the open end 18. The scraper 76 may contact the circumferential wall 37 of the inner cylinder 20 around its entire circumference to prevent any contaminants such as dust from entering the annular space 22 between the outer cylinder 12 and the inner cylinder 20. The scraper 76 may be spring-energised, and may be formed of plastic, for example Turcon® or PTFE.

Having described the structure of the damper 10, its operation will now be described.

Starting from the configuration shown in FIG. 1, as the inner cylinder 20 is pulled out of the outer cylinder 12 (i.e. moves to the left in the sense of the FIGURE), since the first bellows portion 24 is attached at one end 44 to the first closure element 46 which moves with the inner cylinder 20 and at the other end 45 to the damping plate 32 which remains static due to its attachment to the outer cylinder 12, the first bellows portion 24 is forced to expand. Similarly, as the second bellows portion 28 is attached at one end to the second closure element 60 which moves with the inner cylinder 20 and at the other end to the damping plate 32 which remains static due to its attachment to the outer cylinder 12, the second bellows portion 28 is forced to contract. This increases the volume of the first chamber 26, and decreases the volume of the second chamber 30 by an equal amount. Hydraulic fluid in the second chamber 30 is then forced from the second chamber 30, through the damping passage 40, and into the first chamber 26.

Similarly, as the inner cylinder 20 is pushed into the outer cylinder 12, the first bellows portion 24 is forced to contract, and the second bellows portion 28 similarly expands. This decreases the volume of the first chamber 26, and increases the volume of the second chamber 30 by an equal amount. As such, the hydraulic fluid is forced from the first chamber 26 through the damping passage 40 to the second chamber 30.

For both directions of movement, as the hydraulic fluid passes through the damping passage 40, resistance from the hydraulic fluid provides a damping force opposing the flow direction, which provides the damping characteristics of the hydraulic damper 10. The damping characteristics may be tuned to the desired application by tailoring the dimensions of the damping passage 40, the hydraulic fluid, and so on.

The hydraulic damper 10 of the described embodiments may be advantageous in that it provides a damper without traditional hydraulic seals by the use of a sealed bellows assembly. None of the damping fluid will leak from the damper as it is completely contained within the bellows assembly. The damper performance may also be improved, because there is no internal leakage that can pass through piston head seals which are found in traditional dampers to allow the hydraulic fluid to bypass the damping restrictor. Moreover, the damper may avoid potential seal burn-out seen in prior art dampers caused by a lack of seal lubrication. Similarly, the damper may only require on-condition maintenance, as regularly scheduled maintenance to replace seals is not required.

The hydraulic damper 10 may be particularly suitable for damping in low or medium amplitude, high frequency applications, as there are no seals which would otherwise suffer from adverse wear. Examples include use as a helicopter rotor blade lag damper and for vibration suppression applications. Of course, the damper may be used in any application.

Although the figures and the accompanying description describe particular embodiments and examples, it is to be understood that the scope of this disclosure is not limited to such specific embodiments.

It will be appreciated that various modifications may be made to the described embodiments without departing from the disclosure. For example, while the end closures 46, 60 are illustrated as separate elements attached to the bellow sections 24, 28, they could be integrally formed therewith in other embodiments.

Also, while the cartridge type construction of the bellows assembly B is advantageous, the bellows assembly B could, in other embodiments be formed as an integral part of the inner cylinder 20.

In addition, other means than those illustrated may be provided for retaining the bellows assembly B in the inner cylinder 20.

The invention claimed is:
1. A hydraulic damper comprising:
an outer cylinder; and
an inner cylinder slidably mounted within the outer cylinder for movement relative to the outer cylinder along a longitudinal axis;
the inner cylinder having a circumferential wall circumscribing a bellows assembly, the bellows assembly comprising:
a first bellows section;
a second bellows section;
a damping plate attached to and separating the first and second bellows sections;
a first closure element closing an end of the first bellows section opposite the damping plate to define a first chamber; and
a second closure element closing an end of the second bellows section opposite the damping plate to define a second chamber;
the first closure element being attached to the inner cylinder for movement therewith relative to the outer cylinder;
the second closure element being attached to the inner cylinder for movement therewith relative to the outer cylinder;
the damping plate having at least one damping passage extending therethrough and fluidly connecting the first chamber and the second chamber; and
the damping plate being fixed to the outer cylinder by a plurality of elements, each element extending through a respective opening in the circumferential wall of the inner cylinder, whereby the damping plate remains fixed relative to the outer cylinder in the longitudinal direction during movement of the inner cylinder relative to the outer cylinder in the longitudinal direction; and
a liner positioned in an annular space between each of the first and second bellows sections and the circumferential wall of inner cylinder.

2. The hydraulic damper set forth in claim 1, wherein the first and/or second closure elements are separate elements from the first and second bellows sections.

3. The hydraulic damper set forth in claim 2, wherein the first bellows section is welded, for example electron beam welded, to the damping plate and/or to the first closure element.

4. The hydraulic damper as set forth in claim 2, wherein the second bellows section is welded, for example electron beam welded, to the damping plate and/or to the second closure element.

5. The hydraulic damper set forth in claim 1, wherein the first closure element is retained between a step in the circumferential wall of the inner cylinder and an end cap.

6. The hydraulic damper as set forth in claim 5, wherein the end cap defines an annular space between the end cap and the inner cylinder, and an externally threaded retaining ring is received in the annular space and secures the end cap against the first closure element.

7. The hydraulic damper as set forth in claim 5 or 6, wherein the end cap is provided with a first eye end having a first coupling for mounting the inner cylinder to a first component, optionally wherein the first coupling is a spherical bearing.

8. The hydraulic damper as set forth in claim 1, wherein the second closure element is secured against a step in the circumferential wall of the inner cylinder, for example by an internally threaded retaining ring.

9. The hydraulic damper as set forth in claim 1, wherein an end wall of the outer cylinder is provided with a second eye end having a second coupling for mounting the outer cylinder to a second component.

10. The hydraulic damper as set forth in claim 9, wherein the second coupling is a spherical bearing.

11. The hydraulic damper as set forth in claim 1, wherein at least one valve is provided in one of the first or the second closure elements, for filling and/or bleeding the first and second chambers with hydraulic fluid.

12. The hydraulic damper as set forth in claim 1, wherein the liner is formed of a low friction material.

13. The hydraulic damper as set forth in claim 12, wherein the liner is formed of brass.

14. The hydraulic damper as set forth in claim 1, further comprising one or more linear bearings positioned between the outer cylinder and the circumferential wall of the inner cylinder.

15. The hydraulic damper as claim 1, wherein the outer cylinder comprises a scraper contacting the circumferential wall of the inner cylinder around its circumference for preventing contaminants from entering an annular space therebetween.

16. A method of assembling a hydraulic damper as set forth in claim 1, the method comprising:
 assembling the bellows assembly;
 passing the liner over the first or second closure element of the bellows assembly;
 inserting the bellows assembly into the inner cylinder;
 attaching the first and second closure elements of the bellows assembly to the inner cylinder;
 inserting the inner cylinder into the outer cylinder; and
 attaching the damping plate to the outer cylinder.

* * * * *